(12) United States Patent
Chacko et al.

(10) Patent No.: US 9,482,211 B2
(45) Date of Patent: Nov. 1, 2016

(54) HIGH PRESSURE SEALING ARRANGEMENT

(75) Inventors: Shajan V. Chacko, Joplin, MO (US); David C. Wands, Columbus, KS (US)

(73) Assignee: KMT Waterjet Systems Inc., Baxter Springs, KS (US)

(*) Notice: Subject to any disclaimer, the term of this patent is extended or adjusted under 35 U.S.C. 154(b) by 36 days.

(21) Appl. No.: 13/549,232

(22) Filed: Jul. 13, 2012

(65) Prior Publication Data
US 2014/0015202 A1    Jan. 16, 2014

(51) Int. Cl.
| F16L 17/00 | (2006.01) |
| F04B 1/04 | (2006.01) |
| F04B 53/02 | (2006.01) |
| F04B 53/16 | (2006.01) |

(52) U.S. Cl.
CPC ........... F04B 1/0408 (2013.01); F04B 1/0448 (2013.01); F04B 53/02 (2013.01); F04B 53/164 (2013.01)

(58) Field of Classification Search
CPC ..... F16J 15/16; F04B 1/0408; F04B 1/0448; F04B 53/02
See application file for complete search history.

(56) References Cited

U.S. PATENT DOCUMENTS

| 946,001 | A | * | 1/1910 | Armstrong | 277/529 |
| 1,909,016 | A | * | 5/1933 | Schulz | 28/170 |
| 2,735,701 | A | | 2/1956 | Ecker et al. | |
| 3,131,611 | A | * | 5/1964 | McLaughlin | 92/244 |
| 3,323,806 | A | * | 6/1967 | Smith | F16F 9/362 |
| | | | | | 277/584 |
| 3,394,941 | A | * | 7/1968 | Traub | 277/584 |
| 4,082,300 | A | * | 4/1978 | Harbeck et al. | 277/530 |
| 4,239,244 | A | * | 12/1980 | Brent | 277/584 |
| 4,478,423 | A | * | 10/1984 | Hjelsand et al. | 277/516 |
| 4,576,386 | A | | 3/1986 | Benson et al. | |
| 4,934,254 | A | | 6/1990 | Clark et al. | |
| 5,092,609 | A | * | 3/1992 | Balzano et al. | 277/589 |
| 5,472,216 | A | | 12/1995 | Albertson et al. | |
| 6,302,405 | B1 | | 10/2001 | Edwards | |
| 6,497,415 | B2 | * | 12/2002 | Castleman et al. | 277/549 |
| 6,769,695 | B2 | * | 8/2004 | Stephens | 277/584 |
| 7,341,258 | B2 | * | 3/2008 | Holt et al. | 277/584 |
| 7,568,424 | B2 | * | 8/2009 | Hopkins et al. | 92/165 R |
| D616,966 | S | | 6/2010 | Angell | |
| D631,142 | S | | 1/2011 | Angell | |
| D681,176 | S | * | 4/2013 | Chacko | D23/269 |
| 2004/0084848 | A1 | * | 5/2004 | Smith, III | 277/336 |
| 2004/0084851 | A1 | * | 5/2004 | Lugovskoy et al. | 277/500 |
| 2007/0252340 | A1 | * | 11/2007 | Karl et al. | 277/534 |
| 2011/0197757 | A1 | * | 8/2011 | Hold et al. | 92/186 |
| 2014/0044577 | A1 | * | 2/2014 | Shreve et al. | 417/437 |

* cited by examiner

*Primary Examiner* — Kristina Fulton
*Assistant Examiner* — Thomas Neubauer
(74) *Attorney, Agent, or Firm* — Michael Best & Friedrich LLP

(57) ABSTRACT

A seal assembly seals a gap between a pump plunger and a high pressure cylinder of a pump. The assembly includes a seal ring having a bore through which the plunger can extend, a front axial end, and a rear axial end. An O-ring is positioned on the seal ring. A packing ring has a bore through which the plunger can extend, a front axial end abutting the rear axial end of the seal ring, and a rear axial end. A non-metal packing follower has a bore through which the plunger can extend, a front axial end abutting the rear axial end of the packing ring, and a rear axial end. The non-metal packing follower can be ceramic (e.g., carbide) or similar hard, wear-resistant materials.

18 Claims, 9 Drawing Sheets

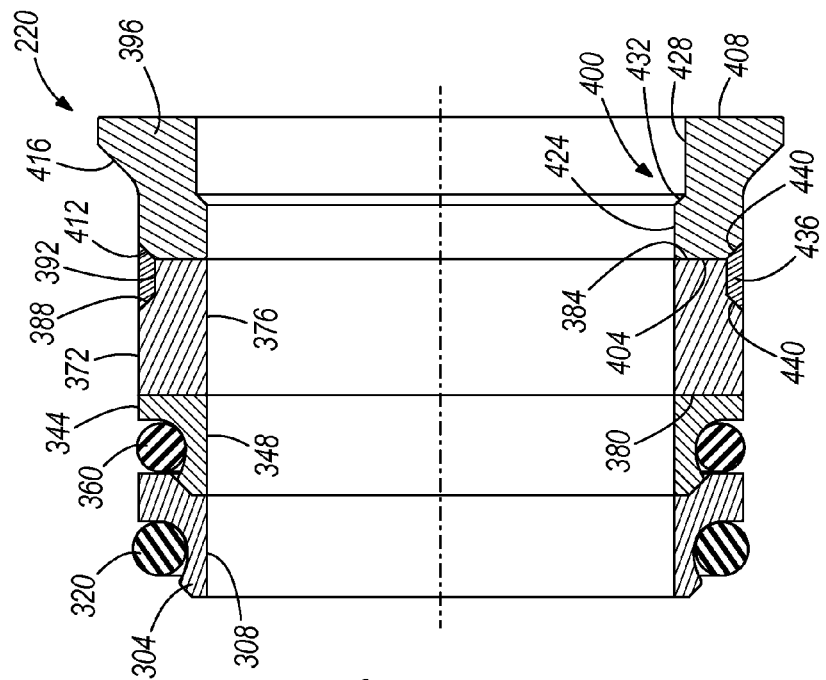
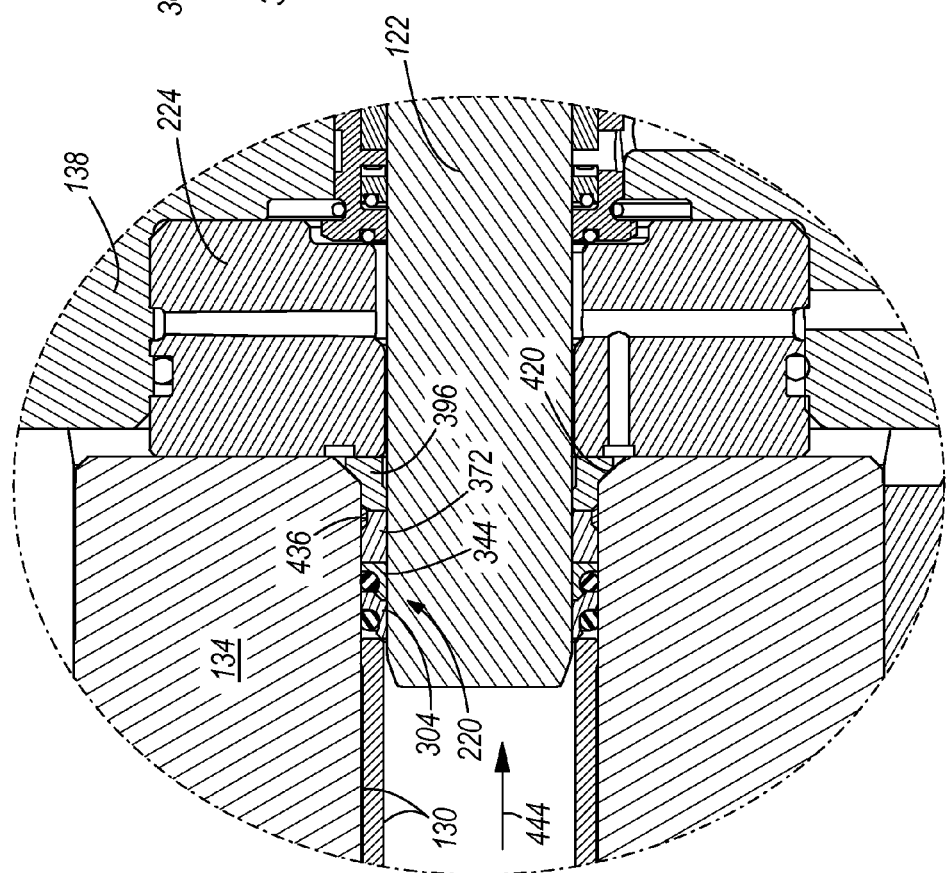
FIG. 6
FIG. 5

HIGH PRESSURE SEALING ARRANGEMENT

BACKGROUND

The present invention relates to a high pressure seal arrangement for an ultrahigh pressure fluid pump, and more particularly to a high pressure seal arrangement for use in sealing a reciprocating plunger pump within a high pressure cylinder of an intensifier pump utilized for pumping fluids.

Precision cutting for industrial and commercial purposes is often accomplished through the use of a waterjet system that directs a high speed stream of water at a material surface to be cut. Waterjet systems pressurize water to 15,000 psi or greater and convert that pressure to a fluid stream traveling at speeds in excess of Mach 2. This high velocity stream, often mixed with an abrasive, is capable of slicing through hard materials such as metal and granite with thicknesses of more than a foot.

The pumps operating within a waterjet system require seal arrangements able to contain the high pressures generated. This includes seal arrangements positioned between the reciprocating plungers and the wall of the cylinder vessels in which the plungers reciprocate. Sealing surfaces of such seals are typically constructed of a softer material than that of the surrounding components and tend to rapidly break down. The softer seal components may also extrude into gaps created during high pressure operation. The resulting wear and degradation requires frequent seal replacement.

SUMMARY

In one aspect, the invention provides a seal assembly for sealing a gap between a pump plunger and a high pressure cylinder of a pump. The seal assembly includes a first seal ring having a bore through which the plunger can extend, a front axial end, and a rear axial end. The rear axial end includes a rear surface defining an undercut. The assembly further includes an O-ring positioned on the first seal ring between the front and rear axial ends of the first seal ring. The assembly further includes a second seal ring having a bore through which the plunger can extend, a front axial end, and a rear axial end. A portion of the front axial end extends into the undercut defined by the rear surface of the first seal ring such that axial pressure exerted on the first seal ring in a direction toward the second seal ring deflects the front axial end of the second ring radially inwardly to facilitate sealing engagement with the plunger. The assembly also includes an O-ring positioned on the second seal ring between the front and rear axial ends of the second seal ring.

In another aspect, the invention provides a seal assembly for sealing a gap between a pump plunger and a high pressure cylinder of a pump. The seal assembly includes a seal ring having a bore through which the plunger can extend, a front axial end, and a rear axial end. An O-ring is positioned on the seal ring between the front and rear axial ends. The assembly further includes a packing ring having a bore through which the plunger can extend, a front axial end abutting the rear axial end of the seal ring, and a rear axial end. The assembly also includes a non-metal packing follower having a bore through which the plunger can extend, a front axial end abutting the rear axial end of the packing ring, and a rear axial end. The non-metal packing follower can be ceramic (e.g., carbide) or similar hard, wear-resistant materials.

Other aspects of the invention will become apparent by consideration of the detailed description and accompanying drawings.

BRIEF DESCRIPTION OF THE DRAWINGS

FIG. 5 is an enlarged partial cross sectional view of a seal arrangement for use in the intensifier pump of FIG. 3 and embodying the invention.

FIG. 6 is an enlarged cross sectional view of the seal arrangement of FIG. 5.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "inner", "outer", "top", "bottom", "front", "rear", "back" and other directional terms are not intended to require any particular orientation, but are instead used for purposes of description only.

It should be noted that "ultrahigh" or 'high pressure" as used herein refers to fluid pressure in excess of 15,000 psi, an more commonly in excess of 60,000 psi. One of ordinary skill in the art will realize that unique problems occur at these high pressures. Thus, solutions common to lower pressure pumps are not necessarily applicable to systems operating at pressures in excess of 15,000 psi and in fact can produce results contrary to those seen in low pressure operation.

Figure 1:
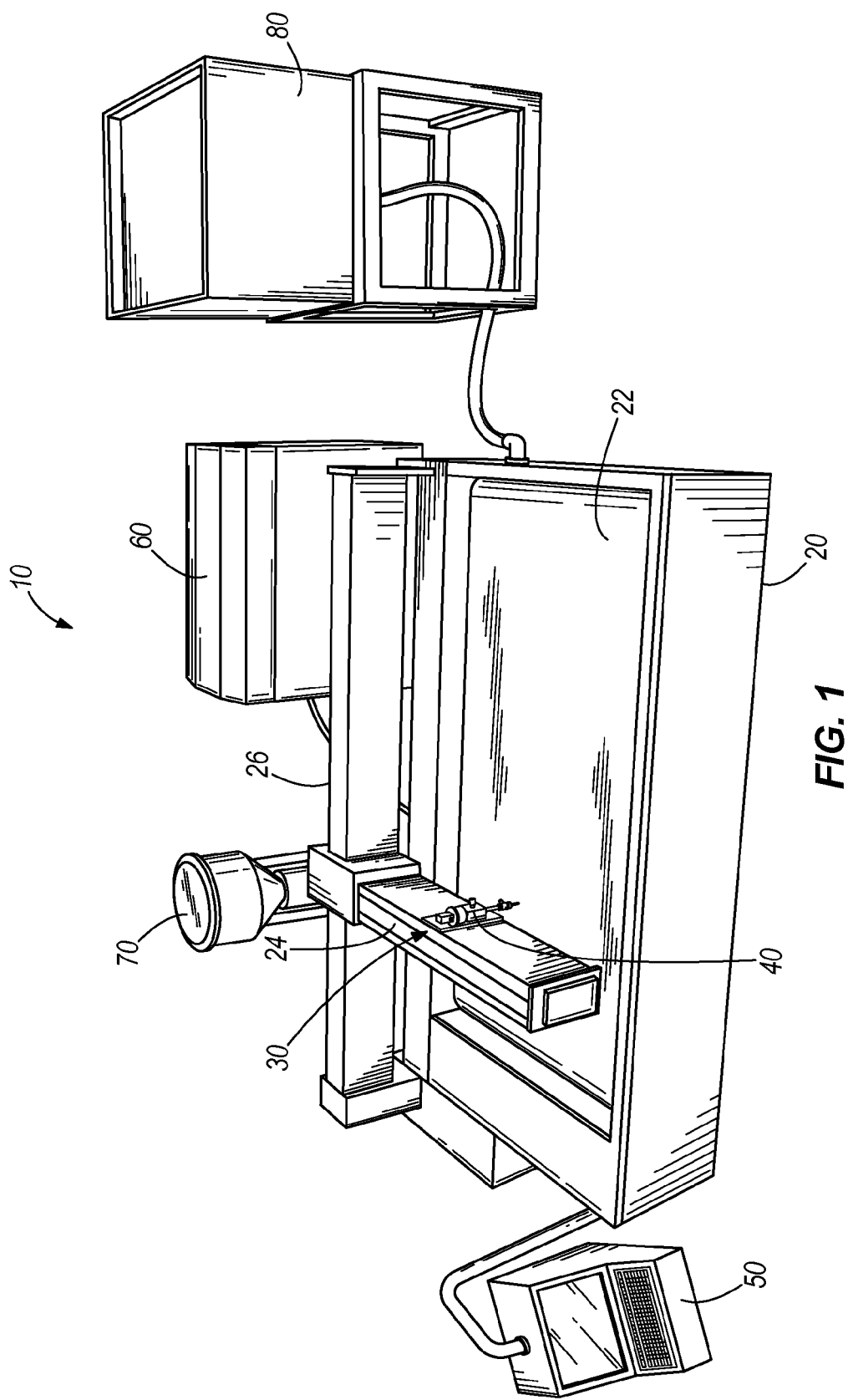
FIG. 1 is a perspective view showing an abrasive waterjet cutting system.

FIG. 1 illustrates an abrasive waterjet cutting system 10 for cutting a particular material with a high pressure stream of water mixed with abrasive. The cutting system 10 includes a cutting table 20 with a material supporting surface 22 and a cutting head assembly 30 that includes a cutting head 40. The cutting head assembly 30 is controlled through a computer 50 and is functionally movable via the arms 24, 26 in a manner known to those of skill in the art to provide cutting at any required operable location on the surface 22. A pumping system 60 generates high pressure fluid, typically water, for the cutting process and provides that water through a high pressure tube (not shown) to the cutting head assembly 30. A feed system 70 supplies an abrasive material, such as garnet, that is combined with the water stream at the cutting head 40. An abrasive removal system 80 filters the wastewater produced in the process to recover the abrasive for further use. The wastewater can be disposed of through a drain or recycled to minimize overall water usage.

Figure 2:
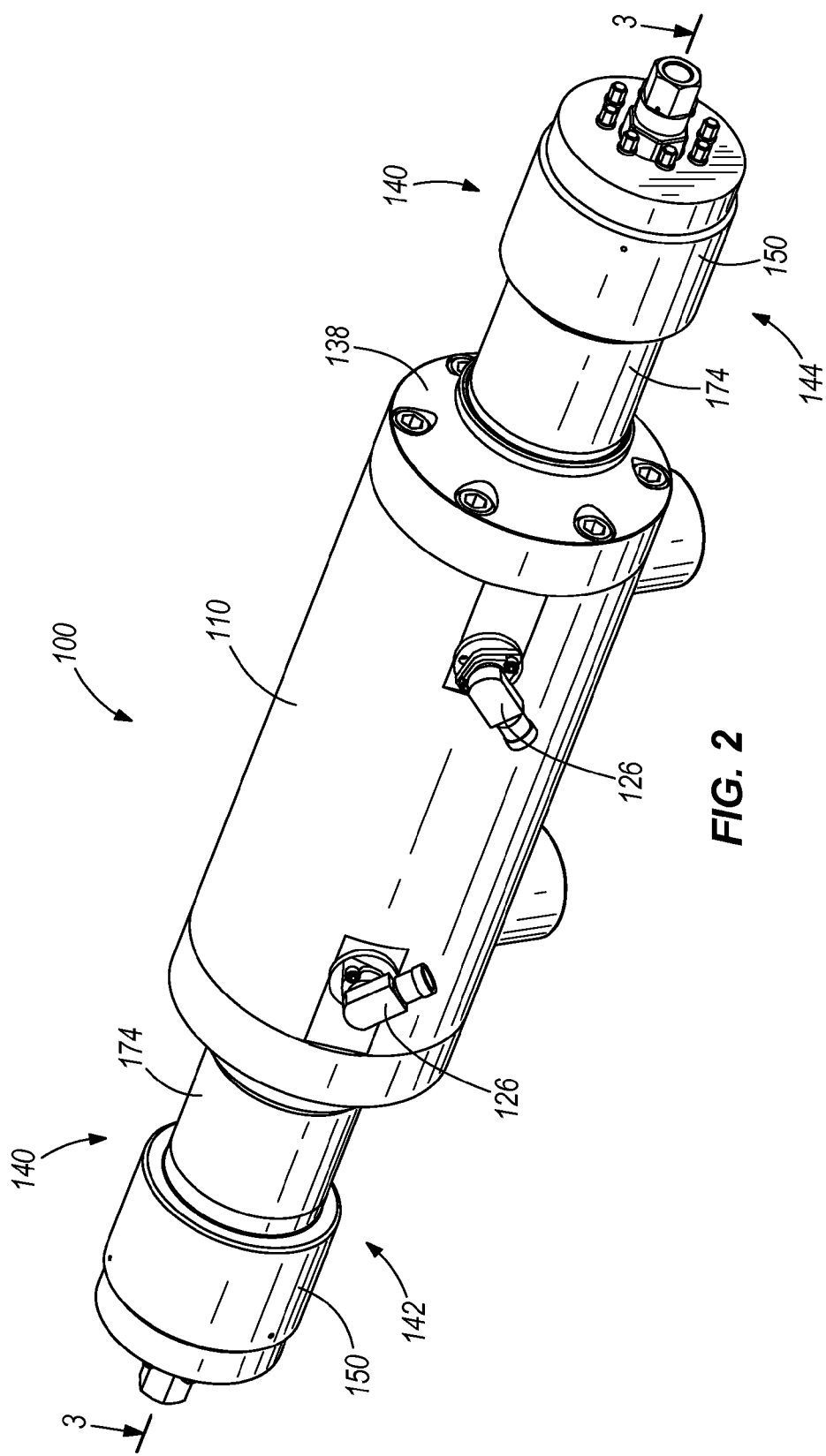
FIG. 2 is a perspective view of the intensifier pump of the abrasive waterjet cutting system of FIG. 1.
Figure 3:
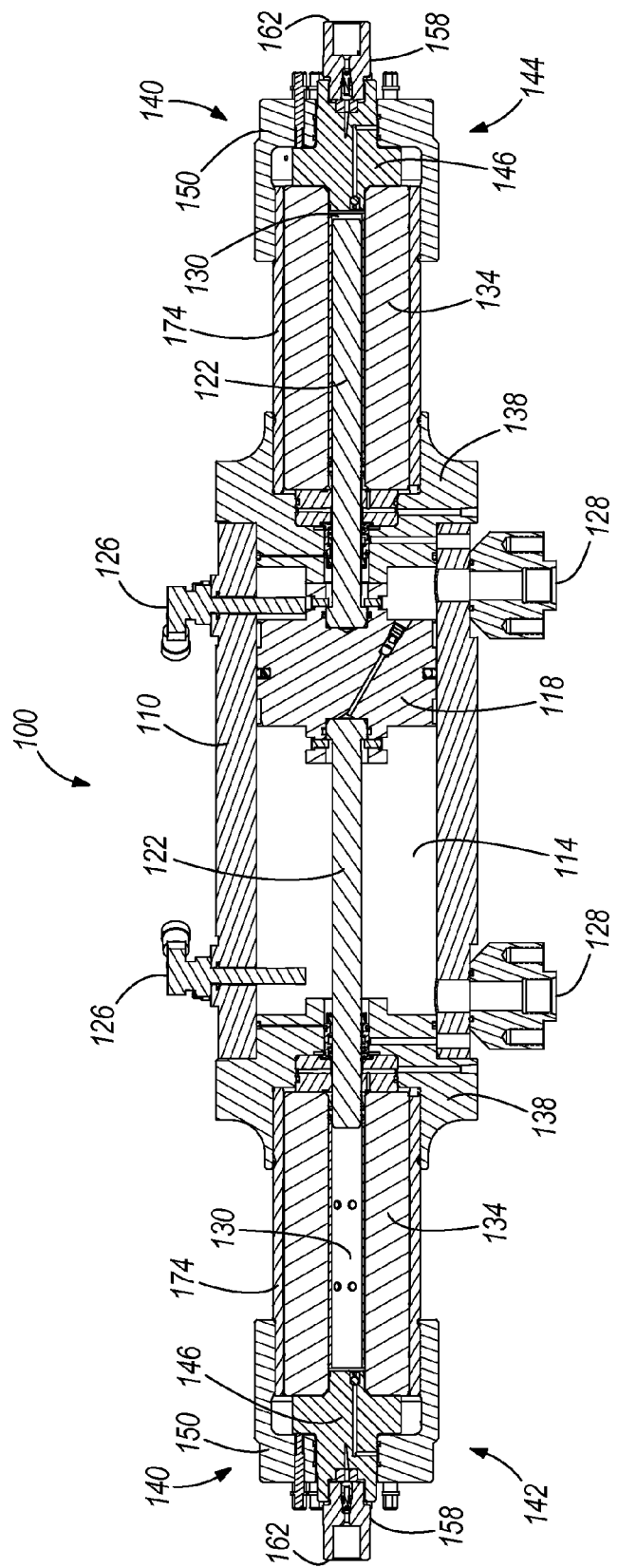
FIG. 3 is a cross sectional view of the intensifier pump of FIG. 2 taken along line 3-3.

FIGS. 2 and 3 illustrate a double acting high pressure pump 100 of the pumping system 60. As is well known to those of skill in the art, this type of pump, also referred to as an intensifier pump, includes a power cylinder 110 defining a hydraulic fluid chamber 114. A double-sided piston 118 coupled to opposing plungers 122 alternates back and forth within the chamber 114 in response to pressurized hydraulic fluid directed into and out of the chamber 114. One or more proximity switches 126 detect the piston 118, and when detected, send a signal to a controller such as a PLC to switch a 4-way valve on the hydraulic pump, thus directing hydraulic oil to the other side of the piston 118 through the ports 128 at the bottom of the power cylinder 110. The piston/plunger assembly acts as a pressure multiplier to increase the pressure of a fluid, such as water, drawn into the bores 130 of two opposing cylindrical vessels 134. The vessels 134 are coupled to the power cylinder 110 through hydraulic cylinder heads 138. A pump head 140 is disposed on the ends 142, 144 of each cylindrical vessel 134. The pump head 140 includes a seal head 146 partially disposed inside an end cap 150. Each end 142, 144 is substantially identical and capable of delivering high pressure fluid to the waterjet cutting system.

Figure 4:
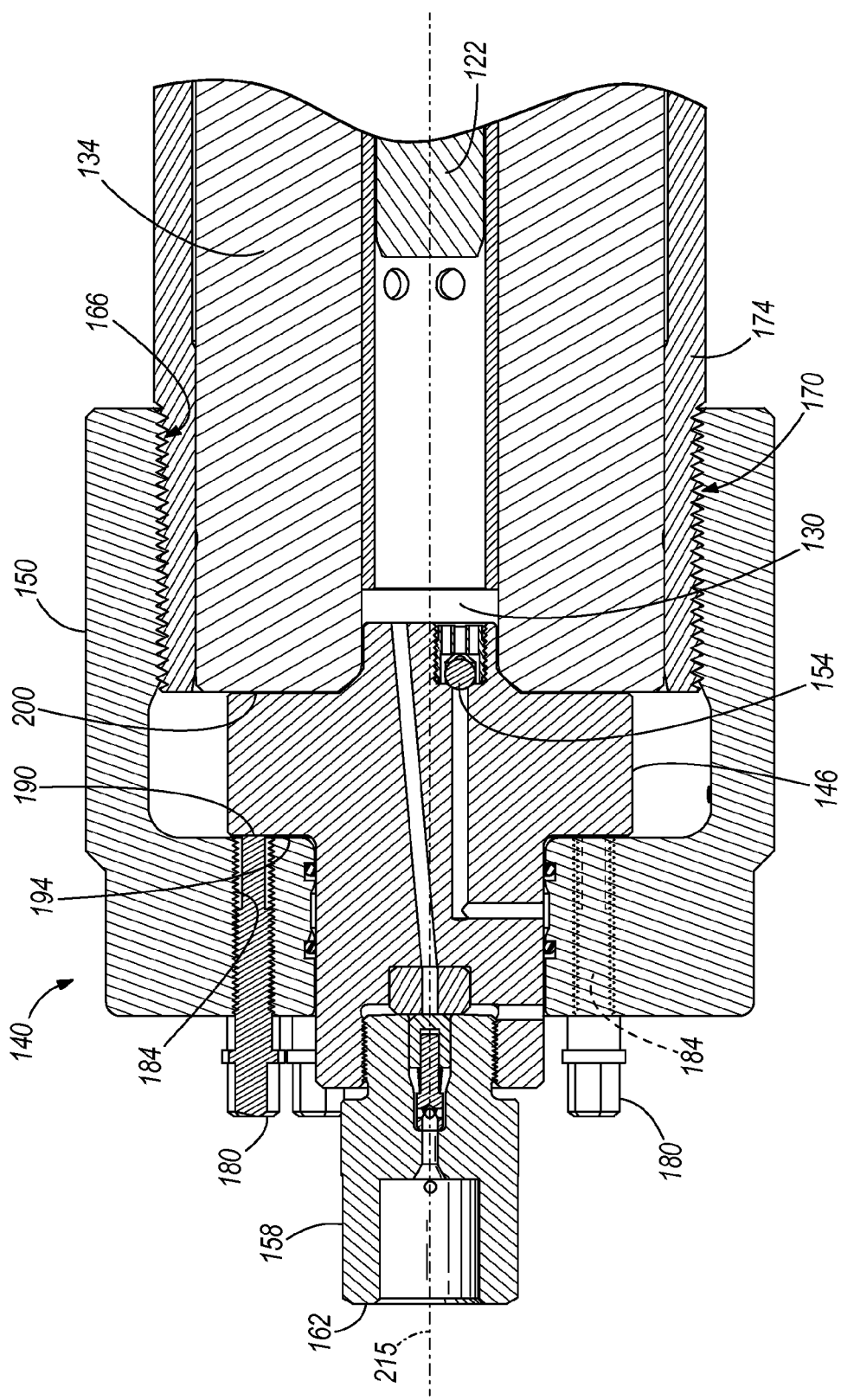
FIG. 4 is a partial cross sectional view of an end portion of the intensifier pump of FIG. 3.

As shown in FIGS. 3 and 4, the seal head assembly 146 includes an inlet check valve 154 configured to allow low pressure water to enter the bore 130 as the plunger 122 is retracted, and an outlet check valve 158 to direct high pressure fluid to the outlet 162 as the plunger 122 advances within the bore 130. Referring to FIG. 4, the end cap 150 in the illustrated embodiment includes female threads 166 for mating with male threads 170 on an outer surface of a hollow stud 174. In other embodiments, the end cap 150 can be secured to the hollow stud 174 with an alternative removable connection. For example, tie rods (not shown) may extend the length of the vessel 134 and couple the hydraulic cylinder head 138 to the end cap 150. A plurality of jack bolts 180 threaded into apertures 184 of the end cap 150 each include end faces 190 that engage the shoulder 194 of the seal head 146 and provide a compressive force to press the seal head 146 into sealing relationship with an end portion 200 of the cylindrical vessel 134. The secured cylindrical vessel 134, seal head 146, and end cap 150 are all concentric with a longitudinal axis 215 through the center of the bore 130.

Referring now to FIG. 5, the intensifier pump 100 includes a pair of seal assemblies 220 (only one is shown in FIG. 5), one on each side of the piston 118 of the pump 100 and oriented in mirror relation to one another. As shown in FIG. 5, each seal assembly 220 is positioned between the plunger 122 and the high pressure cylindrical vessel 134 to seal the gap between the reciprocating plunger 122 and the bore 130 of the high pressure cylinder 134. A retainer 224 sandwiched between the cylinder 134 and the cylinder head 138 positions the seal axially in the bore 130.

Figure 12:
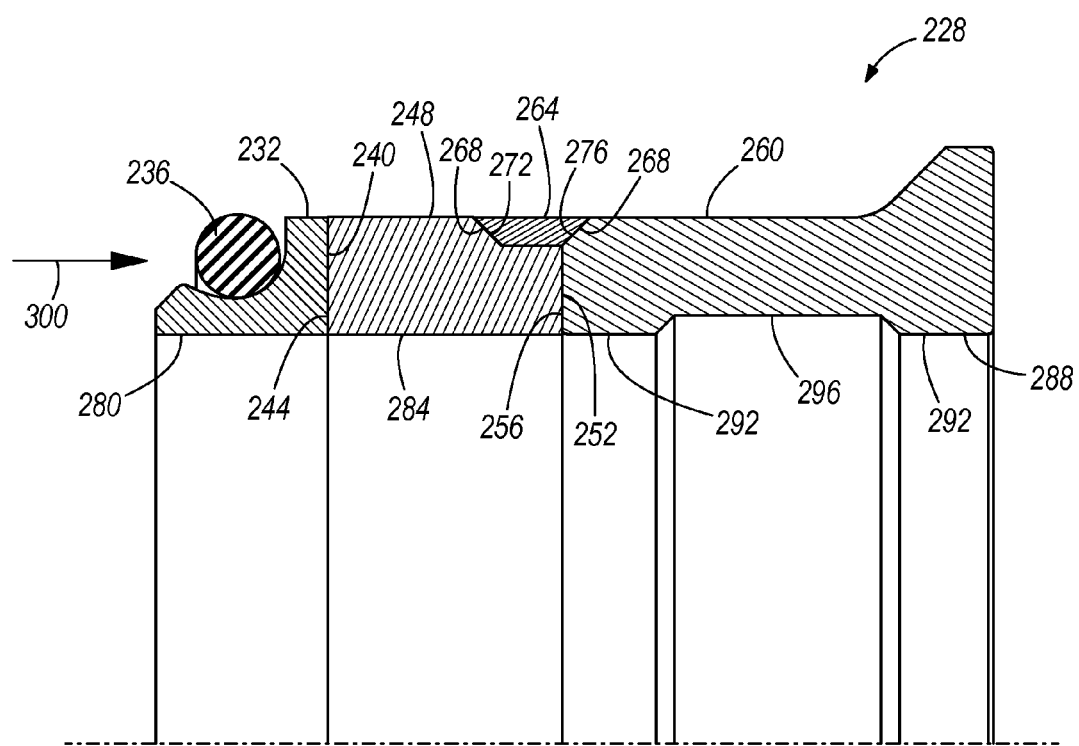
FIG. 12 is an enlarged partial cross sectional view of a prior art seal arrangement.

Before describing the seal assembly 220 of the present invention further, reference is first made to FIG. 12 illustrating a prior art seal assembly 228. The prior art seal assembly 228 includes a seal ring 232 supporting thereon an O-ring 236. The seal ring 232 includes a rear axial end 240 (rear being the direction toward the piston 118) abutting a front axial end 244 of a packing ring 248. A rear axial end 252 of the packing ring 248 abuts a front axial end 256 of a packing follower 260. A wedge ring 264 is supported on an outer (e.g., radially outer) surface of each of the packing ring 248 and the packing follower 260. The wedge ring 264 is trapezoidally-shaped in cross section, with oppositely-facing inclined surfaces 268 abutting chamfer surfaces 272, 276 formed on the packing ring 248 and the packing follower 260, respectively. Each of the seal ring 232, the packing ring 248, and the packing follower 260 define respective bores 280, 284, and 288 through which the plunger 122 can extend and reciprocate. The bore 288 of the packing follower 260 includes two lands or bearing surfaces 292 spaced apart axially from one another and separated by a relief surface 296 having a larger diameter. The two bearing surfaces 292 can have the same diameter, or one of the two bearing surfaces 292 may have a slightly larger diameter than the other (e.g., larger by about 0.004 inches (0.102 mm).

The seal ring 232 and the packing ring 248 are known as "soft seal elements," as they are typically made of low-strength, plastic materials like ultra-high-molecular-weight polyethylene (UHMW). The packing follower 260 is typically made of a higher strength metal (e.g., copper, brass, bronze, etc.) that forms a gap-tight backup to the soft seal elements. Particular care must be taken in the seal design to ensure a minimum "extrusion gap," both at the interface between the seal assembly 228 and the plunger 122, and the interface between the seal assembly 228 and the cylinder bore 130. The phrase "extrusion gap" is known in the art as the gap at these interfaces through which the soft seal elements could possibly extrude or pass through due to the ultrahigh pressures exerted in the pump 100. Current seal assemblies are designed to minimize the extrusion gaps while also extending the life expectancy of the seal assembly and minimizing damage to or hindrance of the plunger 122.

During operation of the pump, the prior art seal 228 experiences high pressure exerted axially in the direction shown by arrow 300. This pressure load is transferred axially through the O-ring 236 and the seal ring 232 to the packing ring 248. The loading causes compression of the packing ring 248 in the direction of the arrow 300, which in turn causes the wedge ring 264 to deflect or expand radially outwardly toward the cylinder bore 130 in part due to the interface between the inclined surface 268 and the mating chamfer surface 272, thereby closing or reducing any extrusion gap between the seal assembly 228 and the cylinder bore 130 caused by radial expansion of the cylinder 134 that occurs during pressurization. The expansion of the wedge ring 264 in addition to its axial movement in the direction of the arrow 300 also causes the packing follower 260 to contract or collapse radially inwardly toward the plunger 122 in part due to the interface between the inclined surface 268 and the mating chamfer surface 276, to close or reduce any extrusion gap between the seal assembly 228 and the plunger 122. By closing or reducing the extrusion gaps in this manner, the polymer packing ring 248 is better prevented from extruding and failing.

Meanwhile, as the plunger 122 reciprocates during pumping action, it engages the bearing surfaces 292 of the packing follower 260, which operate to guide the plunger 122 in the cylinder 134. The friction between the sliding surfaces wears the bearing surfaces 292 of the packing follower 260 away. This is an intended consequence of the prior art seal assembly 228, in which the packing follower 260 is intended to be a sacrificial element that is softer and less wear-resistant than the plunger 122, which is typically made of a hard ceramic material. Over time, even as the bearing surfaces 292 wear away, the packing follower 260 can continue to radially deflect inwardly to keep the extrusion gap closed and accommodate the wear. However, there is eventually a physical limit to the amount the packing follower 260 can deflect or collapse radially inwardly at a particular load. This limit is a function of the elastic modulus of the material of the packing follower 260. Once this deflection limit is reached, the reciprocating plunger 122 continues to wear away the packing follower 260, and consequently, the extrusion gap opens up between the plunger 122 and the packing follower 260. The soft polymer seal material of the packing ring 248 begins to extrude through the gap due to the enormous loads encountered at operating pressure, and seal failure is accelerated and imminent.

The sacrificial metal packing follower 260 offers relatively low sliding friction and is resistant to tolerance changes and misalignment of the plunger 122 and the cylinder 134. This makes the packing follower 260 less likely to scratch or otherwise damage the expensive ceramic plunger 122. However, this benefit comes at the cost of faster wear of the bore 288 (i.e., the bearing surfaces 292) of the packing follower 260, and thus, faster seal extrusion and failure.

Figure 6A:
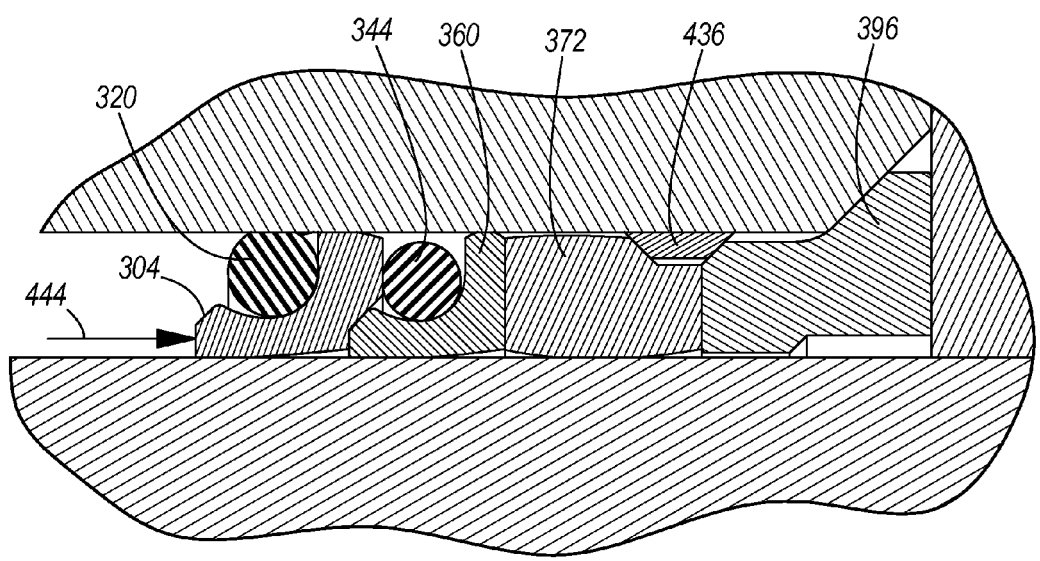
FIG. 6a is an enlarged partial cross sectional view of the seal arrangement of FIG. 5 shown in its sealing condition under high pressure.
Figure 7:
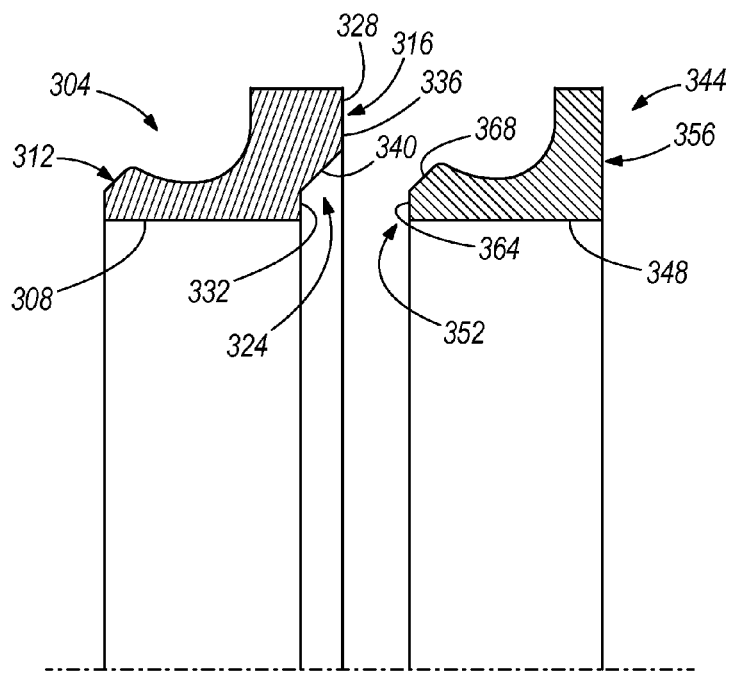
FIG. 7 is a partially exploded section view showing the front and rear seal rings of the seal arrangement of FIG. 5.

Referring now to FIGS. 5-7, the seal assembly 220 of the present invention improves upon the prior art seal assembly 228 to provide a longer-lasting seal. As shown in FIGS. 5 and 6, the seal assembly 220 includes a first or front seal ring 304 having a bore 308 through which the plunger 122 can extend and reciprocate. The front seal ring 304 also includes a front axial end 312 and a rear axial end 316 (see FIG. 7). An O-ring 320 is positioned in a J-profiled groove formed on the outer surface of the front seal ring 304 between the front and rear axial ends 312, 316. The seal ring 304 is made of a polyethylene material (e.g., UHMW).

Referring now to FIG. 7, the rear axial end 316 of the front seal ring 304 defines an undercut 324 formed in a rear surface 328 of the front seal ring 304. The undercut 324 is defined by a first portion 332 of the rear surface 328 that extends substantially normal to the bore 308, a second portion 336 of the rear surface 328 that extends substantially normal to the bore 308 and that is offset axially from the first portion 332, and a third portion 340 of the rear surface 328 that extends oblique to the first portion 332, the second portion 336, and the bore 308. The purpose of the undercut 324 will be described in detail below.

Referring now to FIGS. 5 and 6, the seal assembly 220 further includes a second or rear seal ring 344 having a bore 348 through which the plunger 122 can extend and reciprocate. The rear seal ring 344 also includes a front axial end 352 and a rear axial end 356 (see FIG. 7). A portion of the front axial end 352 extends into the undercut 324 defined by the rear surface 328 of the first seal ring 304, such that axial pressure exerted on the first seal ring 304 in a direction toward the second seal ring 344 deflects the front axial end 352 of the second seal ring 344 radially inwardly to facilitate sealing engagement with the plunger 122 (see FIG. 6a). In the illustrated embodiment, the portion of the front axial end 352 extending into the undercut 324 fills substantially the entire undercut 324. An O-ring 360 is positioned in a J-profiled groove formed on the outer surface of the rear seal ring 344 between the front and rear axial ends 352, 356. The seal ring 344 is also made of a polyethylene material (e.g., UHMW).

Referring again to FIG. 7, the portion of the front axial end 352 of the second seal ring 344 that extends into the undercut 324 is defined by a surface having a first portion 364 abutting and corresponding in length to the first portion 332 of the rear surface 328 of the front seal ring 304, and a second portion 368 abutting and corresponding in length to the third portion 340 of the rear surface 328 of the front seal ring 304. The second portion 368 of the rear seal ring 344 shares the same oblique angle as the third portion 340 of the front seal ring 304, which angle of abutment facilitates the deflection of the front axial end 352 of the second seal ring 344 radially inwardly to facilitate sealing engagement with the plunger 122 (see FIG. 6a). In the illustrated embodiment, the third portion 340 and the second portion 368 are angled at about forty-five degrees relative to the bores 308, 348 of the seal rings 304, 344. In other embodiments, the angles can be optimized as desired.

With reference to FIGS. 5 and 6, the seal assembly 220 further includes a packing ring 372 made of a polymer material. Together, the seal rings 304, 344 and the packing ring 372 define the soft seal elements of the seal assembly. They are compressible axially, and thereby are deemed to be "energizing components" of the seal assembly. The packing ring 372 includes a bore 376 through which the plunger 122 can extend and reciprocate, a front axial end 380 abutting the rear axial end 356 of the rear seal ring 344, and a rear axial end 384. An outer surface of the packing ring 372 includes a chamfered surface 388 and a recessed surface 392, the purpose of which will be discussed below.

The seal assembly 220 further includes a packing follower 396 having a bore 400 through which the plunger 122 extends and reciprocates. A front axial end 404 abuts the rear axial end 384 of the packing ring 372. The packing follower 396 also includes a rear axial end 408 that abuts the retainer 224. The illustrated packing follower 396 includes a chamfered surface 412 adjacent the front axial end 404, and tapers radially outwardly adjacent the rear axial end 408 to define a shoulder or flange 416 that abuts a corresponding chamfered surface 420 (see FIG. 5) of the cylinder 134 to limit axial movement of the packing follower 396 away from the retainer 224.

The bore 400 of the packing follower 396 includes a first or bearing surface 424 (i.e., land) that defines a single, radially-innermost diameter of the bore 400 configured for possible sliding engagement with the plunger 122, and a second surface 428 having a diameter greater than the bearing surface 424 to form a stepped bore 400. In the illustrated embodiment, the second surface 428 is parallel to the first surface 424 and is separated from the bearing surface 424 by a chamfered transition surface 432. The bearing surface 424 is manufactured to have nearly a line-on-line sliding fit with the plunger 122. The maximum manufactured diametral clearance between the bearing surface 424 and the plunger 122 can be up to 0.0015 inches (0.0381 mm) in some cases, but in most cases is less than or equal 0.0002 inches (0.005 mm). The second surface 428 does not contact the plunger 122 and there is no other bearing surface provided for engaging the plunger 122.

The single bearing surface 424 is immediately adjacent the front axial end 404 of the packing follower 396, and preferably extends axially toward the rear axial end 408 a distance of about 0.010 inches (0.254 mm) to about 0.30 inches (7.62 mm) to minimize friction, to minimize the chances of plunger damage, and to increase the seal life. In some embodiments, the axial length of the bearing surface 424 can be increased up to 0.5 inches (12.7 mm), but this comes at the risk of increased friction and increased plunger damage. In yet other embodiments, the axial length of the bearing surface 424 can be as short as a sharp "knife edge," however such a short bearing surface may not provide as much guidance for the plunger 122. Having only the single bearing surface 424 adjacent the front axial end 404 minimizes the risk of any small extruded seal bits becoming trapped in a relief groove or collection area formed between two bearing surfaces. Instead, any debris is free to collect adjacent the second surface 428 and will not be forced (via pressure) into a gap between any subsequent bearing surface and the plunger 122.

The packing follower 396 is non-metallic and preferably ceramic (e.g., oxides, non-oxides, ceramic composites such as but not limited to alumina, zirconia, carbide, silicon nitride, tungsten carbide, and the like), and is not designed to be a sacrificial element like the prior art metal packing follower 260. Instead, the packing follower 396 is preferably ceramic and is made to be much harder, stronger, and more wear-resistant than prior art soft-metal packing followers. While conventional practice and thinking has been that a smallest possible extrusion gap (possibly zero) will result in longer seal life, the use of the hard, preferably ceramic packing follower 396 has surprisingly resulted in a contrary finding. Specifically, even with the packing follower 396 having a diametrical clearance up to 0.0015 inches (0.0381 mm), and with the reduced radially-inward deflection due to the hard ceramic material, seal assemblies using the ceramic packing follower 396 have tested to a longer seal life than prior art seals having metal packing followers with smaller diametrical clearances (e.g., 0.0002 inches (0.005 mm)). In other words, even though ceramic packing followers 396 have very little or no radially-inward deflection, such that the extrusion gap is not closed and the bore of the packing follower 396 does not circumferentially contact the plunger 122 completely during operation of the pump 100, longer seal life has been achieved. This is because the lack of radially-inward deflection of the packing follower 396 minimizes or eliminates the cyclic pinching or "nibbling" of the packing ring 372 that occurs with prior art metal packing followers.

When prior art metal packing followers with tight diametrical clearance cyclically deflect radially inward and then back outward during operation of the pump, the packing followers slowly pinch and break off (i.e., "nibble") the packing ring that is extruding into the extrusion gap. The packing ring gets repeatedly pinched between the packing follower and the plunger. Small pieces of the packing ring break off during operation until the packing ring eventually fails and is no longer able to support the softer seal ring in front, resulting in failure of the seal ring as well. As the bore of the metal packing follower wears, the diametrical clearance increases, allowing more and more extrusion of the packing ring, and the nibbling continues due to the repeated radially-inward deflection. The ceramic packing follower 396 of the current invention deflects radially-inwardly much less (e.g., about 3 to 5 times less) than conventional metal packing followers. This smaller deflection in combination with larger diametrical clearance reduces or eliminates pinching of the packing ring between the packing follower 396 and the plunger 122, thereby reducing or eliminating "nibbling" of the packing ring. This results in longer seal life.

The packing follower 396 can be made of ceramic (e.g., zirconia, carbide, silicon nitride, tungsten carbide, etc.), or similar hard, wear-resistant materials. The packing follower 396 has a hardness greater than conventional metal packing followers. For example, a conventional metal packing follower typically has a hardness in the range of about 57 to 65 HRA, while the packing follower 396 has a hardness of at least 74 HRA, with the illustrated embodiment having a hardness of about 75 HRA to about 93 HRA depending on the grade and type of ceramic employed. The packing follower 396 also has an elastic modulus greater than that of conventional metal packing followers. For example, a conventional metal packing follower typically has an elastic modulus between $16 \times 10^6$ psi and $21 \times 10^6$ psi, while the packing follower 396 has an elastic modulus of at least $29 \times 10^6$ psi, with the illustrated embodiment having an elastic modulus between about $60 \times 10^6$ psi to about $95 \times 10^6$ psi depending on the grade and type of ceramic employed. The packing follower 396 further has an abrasion resistance factor (1/volume loss ($mm^3$)) greater than 35, with the illustrated embodiment being about 65 to about 165 depending on the grade and type of ceramic.

A wedge ring 436 is supported on an outer (e.g., radially outer) surface of each of the packing ring 372 and the packing follower 396. The wedge ring 436 is trapezoidally-shaped in cross section, with oppositely-facing inclined surfaces 440 abutting chamfer surfaces 388, 412 formed on the packing ring 372 and the packing follower 396, respectively. The wedge ring 436 is made of a soft metal (e.g., copper, brass, bronze, etc.). Together, the wedge ring 436 and the packing follower 396 are the higher strength, gap-control components designed to reduce or eliminate the gaps to reduce or prevent extrusion of the soft seal components therethrough. They back up the soft seal components by accommodating changes in the diameter of the cylinder bore 130 that occur during pumping. Even where the extrusion gap is not reduced completely, the capability of the packing follower 396 to minimize radially-inward deflection, and thereby minimize or eliminate nibbling of the seal ring 372, preserves the softer seal ring 372 and increases the life of the seal.

With reference to FIGS. 5-6a, during operation of the pump 100, the seal assembly 220 experiences high pressure exerted axially in the direction shown by arrow 444. This pressure load is transferred axially through the O-ring 320 and the front seal ring 304 to the rear seal ring 344. As described above, and as shown in FIG. 6a, the axial loading combined with the portion of the axial front end 352 of the rear seal ring 344 that is received in the undercut 324 of the front seal ring 34 causes the axial front end 352 to deflect radially inwardly into sealing engagement with the plunger 122. This is due, in part, to the cam-like interface between the inclined third portion 340 and inclined second portion 368 of the respective seal rings 304, 344. The front seal ring 304 and the packing ring 372 will also deflect radially inwardly into sealing engagement with the plunger 122. The packing follower 396, as described above, may or may not deflect into engagement with the plunger 122. Testing has shown this dual seal ring arrangement to yield a longer seal life than a single seal ring arrangement as used in the prior art seal assembly 228.

The axial loading of the rear seal ring 344 is transmitted to the packing ring 372, thereby causing compression of the packing ring 372 in the direction of the arrow 444. This compression of the packing ring 372, and the interface at the abutting inclined surface 440 and chamfer surface 388, causes the wedge ring 436 to deflect or expand radially outwardly toward the cylinder bore 130 (see FIG. 6a), thereby closing or reducing any extrusion gap between the seal assembly 220 and the cylinder bore 130 caused by the radial expansion of the cylinder 134 that occurs during pressurization.

The expansion of the wedge ring 436 also causes, via the interface at the abutting inclined surface 440 and chamfer surface 412, the packing follower 396 to contract or collapse radially inwardly toward the plunger 122 (albeit less than the softer prior art packing follower 260) to close or reduce any extrusion gap between the seal assembly 220 and the plunger 122. However, the high strength of the packing follower 396 substantially prevents the packing follower 396 from clamping down tightly onto the plunger 122, thereby preventing significant damage to the plunger 122 even at ultrahigh pressures. With the packing follower 396 closing or reducing the extrusion gaps in this controlled and consistent manner, without nibbling the packing ring 372 as discussed above, the polymer packing ring 372 and the seal rings 304, 344 are better prevented from extruding, degrading, and failing. The high strength properties of the packing follower 396, and the resulting resistance to inward deflection, allow for achieving the desired fit to the plunger 122 both when the pump 100 is unloaded, and when the pump 100 is loaded under ultrahigh pressures. Together, the wedge ring 436 and the packing follower 396 operate as back-up elements that prevent or limit extrusion or degradation of the soft seal elements at both the inner and outer diameters of the seal assembly 220.

Figure 8:
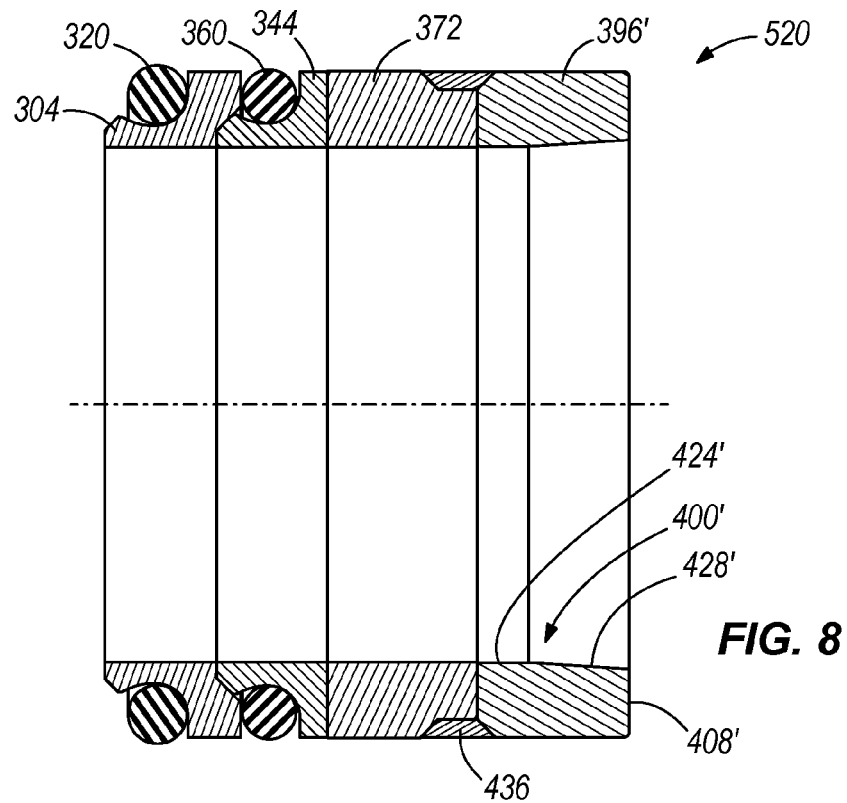
FIG. 8 is an enlarged cross sectional view of an alternative seal arrangement embodying the invention.

FIG. 8 illustrates another seal assembly 520 according to the present invention. The seal assembly 520 is similar to the seal assembly 220, and like parts have been given like reference numerals. Only the differences are described below. The seal assembly 520 includes a modified packing follower 396' in which the bore 400' includes a first or bearing surface 424' that is the same as described above with respect to the packing follower 396, but has an alternative arrangement for the second surface 428'. Instead of being stepped and parallel, the second surface 428' is a frustoconical surface concentric with the bearing surface 424' and having a diameter that increases from the diameter of the bearing surface 424' in an axial direction toward the axial rear end 408' of the packing follower 396'. This tapering of the second surface 428' provides relief area for seal debris to gather, so that debris does not cause binding and heat build-up at the plunger 122. Additionally, the packing follower 396' is configured without the flange 416 present on the packing follower 396.

Figure 9:
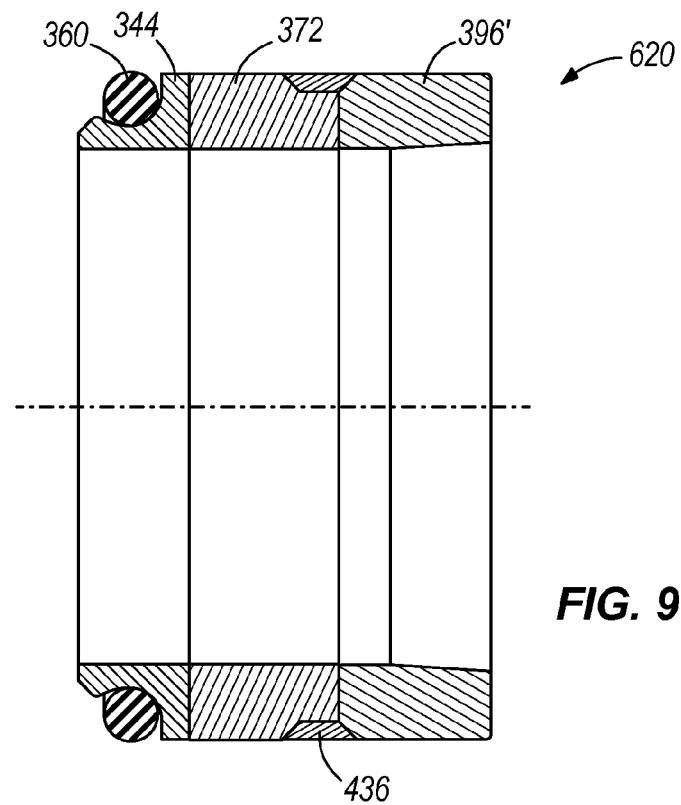
FIG. 9 is an enlarged cross sectional view of yet another alternative seal arrangement embodying the invention.

FIG. 9 illustrates yet another seal assembly 620 according to the present invention. The seal assembly 620 has similarities to both the seal assemblies 220 and 520, and like parts have been given like reference numbers. Only the differences are described below. Specifically, seal assembly 620 lacks the front seal ring 304 and the O-ring 320. While the use of two seal rings has been found to provide excellent results, in some embodiments only one seal ring 344 need be used.

Figure 10A:
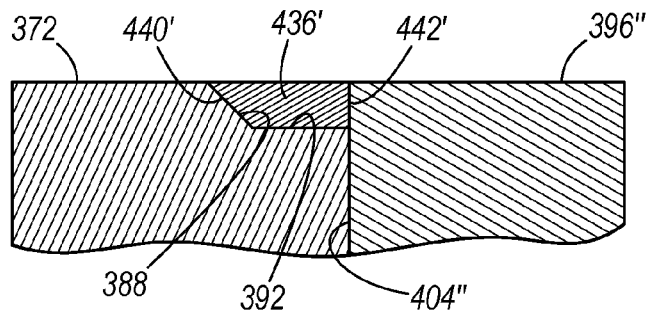
FIG. 10a is an enlarged partial cross sectional view illustrating an alternative wedge ring configuration.
Figure 10B:
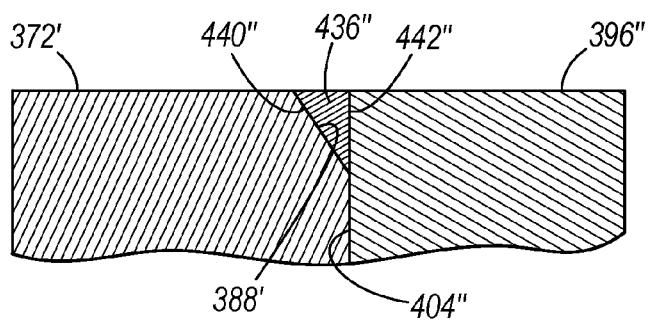
FIG. 10b is an enlarged partial cross sectional view illustrating another alternative wedge ring configuration.

FIGS. 10a and 10b illustrate alternate wedge ring configurations that can be used with any of the seal assemblies 220, 520, and 620 described above. Since the packing followers 396, 396' are made from high strength, wear-resistant materials as described above, and can be manufactured with the tight diametrical clearance to the plunger 122 as discussed above, it may not be necessary to rely on the wedge ring to collapse or compress the packing followers 396, 396' radially inwardly as discussed above. The alternate wedge rings 436', 436" shown in FIGS. 10a and 10b, respectively, take this into account.

The wedge ring 436' illustrated in FIG. 10a, while still having a trapezoidal cross section, has only one inclined surface 440' that abuts the chamfered surface 388 of the packing ring 372. The surface 442' of the wedge ring 436' opposite the inclined surface 440' is generally vertical and abuts an axial front end 404" of a modified packing follower 396" that does not include any chamfered surface adjacent its axial front end 404". This arrangement still enables the pressure load transferred from the packing ring 372 to the wedge ring 436' to deflect or expand the wedge ring 436' radially outwardly, but does not result in the radially inward collapse of the packing follower 396".

The wedge ring 436" illustrated in FIG. 10b has a triangular cross section, and more specifically, a right-triangular cross section. It can be smaller than the wedge ring 436'. It has only one inclined surface 440" that abuts the chamfered surface 388' of the packing ring 372', which is modified only insofar as it accommodates the wedge ring 436" on its outer surface (i.e., surface 392 is eliminated). The surface 442" of the wedge ring 436" opposite the inclined surface 440" is generally vertical and abuts the axial front end 404" of the modified packing follower 396" that does not include any chamfered surface adjacent its axial front end 404". This arrangement still enables the pressure load transferred from the packing ring 372' to the wedge ring 436" to deflect or expand the wedge ring 436" radially outwardly, but does not result in the radially inward collapse of the packing follower 396".

Figure 11:
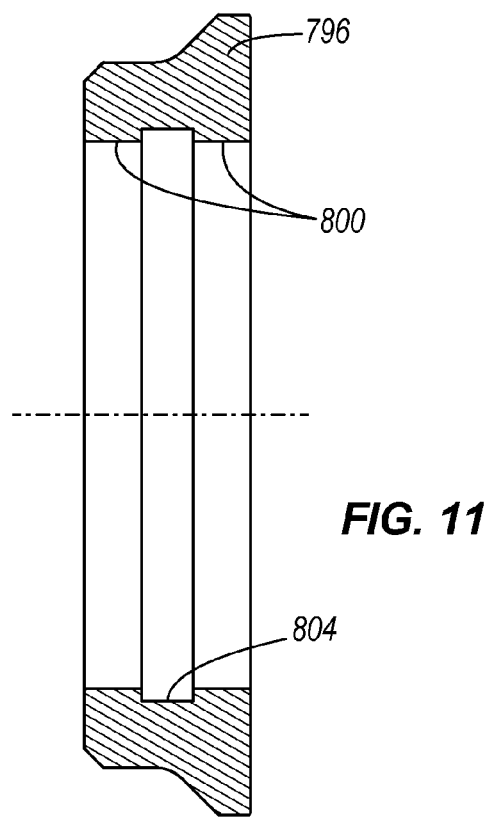
FIG. 11 is en enlarged partial cross sectional view illustrating an alternative packing follower configuration.

FIG. 11 illustrates an alternate packing follower 796 that could be used with any one of the seal arrangements 220, 520, and 620. The packing follower 796 is similar to the prior art packing follower 260 in the sense that it includes first and second spaced apart lands or bearing surfaces 800 that define two radially-innermost diameters of the bore configured to engage the plunger 122, and that are separated by an intermediate, larger-diameter third relief surface 804. The two bearing surfaces 800 can have the same diameter, or one of the two bearing surfaces 292 may have a slightly larger diameter than the other (e.g., larger by about 0.004 inches (0.102 mm). However, it is different from the prior art in that it is not made of soft-metal or intended to be sacrificial. Instead, the packing follower 796 is made of a high strength, high wear-resistant, non-metal material as described above with respect to packing follower 396. For example, the packing follower 796 can be made of ceramic (e.g., zirconia, carbide, silicon nitride, tungsten carbide, etc.). Additionally, as illustrated in FIG. 11, the bearing surfaces 800 are shorter, both individually and in combined length, than the bearing surfaces 292 of the prior art packing follower 260.

In some instances, the packing follower 796 may be preferred to the single-land followers described above as it can provide better guidance for the plunger 122. While the packing follower 796 is shown with a chamfer like the chamfer 268, in other embodiments the chamfer may be eliminated like with the follower 396".

Various features of the invention are set forth in the following claims.

We claim:

1. A seal assembly for sealing a gap between a pump plunger and a high pressure cylinder of a pump, the seal assembly comprising:

a first seal ring having a bore through which the plunger extends, a front axial end, and a rear axial end, the rear axial end including a rear surface defining an undercut, the first seal ring positioned to contact both the pump plunger and the high pressure cylinder;

a first O-ring positioned on the first seal ring between the front and rear axial ends of the first seal ring to selectively in the presence of fluid pressure forms a first seal between the first seal ring and the high pressure cylinder;

a second seal ring having a bore through which the plunger extends, a front axial end, and a rear axial end, a portion of the front axial end extending into the undercut defined by the rear surface of the first seal ring such that axial pressure exerted on the first seal ring in a direction toward the second seal ring deflects the front axial end of the second seal ring radially inwardly to facilitate sealing engagement with the plunger, the second seal ring positioned to contact both the pump plunger and the high pressure cylinder; and a second O-ring positioned on the second seal ring between the front and rear axial ends of the second seal ring to selectively in the presence of fluid pressure forms a second seal between the second seal ring and the high pressure cylinder, wherein the high pressure fluid transmits a pressing force from the first seal ring toward the second seal ring and the second seal is axially spaced apart from the first seal;

wherein the undercut of the first seal ring is defined by a first portion of the rear surface that extends substantially normal to the bore, a second portion of the rear surface that extends substantially normal to the bore and that is offset axially from the first portion, and a third portion of the rear surface that extends oblique to the first portion, the second portion, and the bore;

wherein the portion of the front axial end of the second seal ring that extends into the undercut is defined by a surface having a first portion abutting and corresponding in length to the first portion of the rear surface of the first seal ring, and a second portion abutting and corresponding in length to the third portion of the rear surface of the first seal ring.

2. The seal assembly of claim 1, wherein the portion of the front axial end of the second seal ring extending into the undercut of the second seal ring fills substantially the entire undercut.

3. The seal assembly of claim 1, further comprising:
a packing ring having a bore through which the plunger extends, a front axial end abutting the rear axial end of the second seal ring, and a rear axial end; and
a packing follower having a bore through which the plunger extends, a front axial end abutting the rear axial end of the packing ring, and a rear axial end.

4. The seal assembly of claim 3, further comprising a wedge ring supported on an outer surface of at least one of the packing ring and the packing follower, the wedge ring operable to expand radially outwardly upon exertion of axial pressure on the packing ring in a direction toward the packing follower.

5. The seal assembly of claim 4, wherein radial expansion of the wedge ring causes the packing follower to collapse radially inwardly.

6. The seal assembly of claim 3, wherein the bore of the packing follower includes a first surface that defines a single, radially-innermost diameter of the bore configured for engagement with the plunger, and a second surface having a diameter equal to or greater than the first surface.

7. The seal assembly of claim 6, wherein the first surface has an axial length of between about 0.010 to about 0.4 inches.

8. The seal assembly of claim 6, wherein the first surface is immediately adjacent the front axial end of the packing follower.

9. The seal assembly of claim 3, wherein the bore of the packing follower includes first and second bearing surfaces, and a third surface intermediate the first and second bearing surfaces, the third surface having a diameter greater than the first and second bearing surfaces, the first surface, the second surface, and the third surface being parallel to one another.

10. The seal assembly of claim 3, wherein the packing follower is non-metal.

11. The seal assembly of claim 10, wherein the packing follower is made of a ceramic.

12. A seal assembly for sealing a gap between a pump plunger and a high pressure cylinder of a pump, the seal assembly comprising:
a first seal ring having a bore through which the plunger extends, a front axial end, and a rear axial end including a rear surface defining an undercut, the first seal ring positioned to contact both the pump plunger and the high pressure cylinder;

a first O-ring positioned on the seal ring between the front and rear axial ends and in the presence of fluid pressure forms a seal between the seal ring and the high pressure cylinder;

a second seal ring having a bore through which the plunger extends, a front axial end, and a rear axial end, a portion of the front axial end extending into the undercut defined by the rear surface of the first seal ring such that axial pressure exerted on the first seal ring in a direction toward the second seal ring deflects the front axial end of the second seal ring radially inwardly to facilitate sealing engagement with the plunger, the second seal ring positioned to contact both the pump plunger and the high pressure cylinder;

a second O-ring positioned on the second seal ring between the front and rear axial ends of the second seal ring to selectively in the presence of fluid pressure forms a second seal between the second seal ring and the high pressure cylinder, wherein the high pressure fluid transmits a pressing force from the first seal ring toward the second seal ring and the second seal is axially spaced apart from the first seal;

wherein the undercut of the first seal ring is defined by a first portion of the rear surface that extends substantially normal to the bore, a second portion of the rear surface that extends substantially normal to the bore and that is offset axially from the first portion, and a third portion of the rear surface that extends oblique to the first portion, the second portion, and the bore;

wherein the portion of the front axial end of the second seal ring that extends into the undercut is defined by a surface having a first portion abutting and corresponding in length to the first portion of the rear surface of the first seal ring, and a second portion abutting and corresponding in length to the third portion of the rear surface of the first seal ring;

a packing ring having a bore through which the plunger extends, a front axial end abutting the rear axial end of the seal ring, and a rear axial end, and a non-metal packing follower having a bore through which the plunger extends, a front axial end abutting the rear axial end of the packing ring, and a rear axial end disposed substantially flush with an outer end of the high pressure cylinder, wherein the bore of the packing follower includes a first surface that defines a single, radially-innermost diameter of the bore, and a second surface having a diameter greater than the first surface, the second surface extending from the first surface to the rear axial end of the packing follower.

13. The seal assembly of claim 12, wherein the packing follower is made of a material that includes a ceramic.

14. The seal assembly of claim 13, wherein the ceramic includes one of zirconia, carbide, boride, nitride, and ceramic composite.

15. The seal assembly of claim 12, wherein the packing follower has a hardness of at least 74 HRA.

16. The seal assembly of claim 12, wherein the packing follower has an elastic modulus of at least $29 \times 10^6$ psi.

17. The seal assembly of claim 12, wherein the bore of the packing follower includes first and second bearing surfaces of the bore, and a third surface intermediate the first and second bearing surfaces, the third surface having a diameter greater than the first and second bearing surfaces, the first surface, the second surface, and the third surface being parallel to one another.

18. The seal assembly of claim 12, wherein the bore of the packing ring contacts the plunger during operation of the pump.

* * * * *